United States Patent [19]
Haxton et al.

[11] Patent Number: 6,102,332
[45] Date of Patent: Aug. 15, 2000

[54] HIGH CAPACITY AIR TRANSPORT SYSTEM AND METHOD

[75] Inventors: Phil Haxton, Dunwoody, Ga.; Thomas W. Carlyle, Everett, Wash.

[73] Assignee: H-C Designs, Inc., Atlanta, Ga.

[21] Appl. No.: 09/086,093

[22] Filed: May 28, 1998

Related U.S. Application Data

[60] Provisional application No. 60/073,969, Feb. 6, 1998.

[51] Int. Cl.[7] ........................................................ B64D 9/00
[52] U.S. Cl. ..................... 244/118.2; 244/140; 244/137.1
[58] Field of Search ............................ 244/2, 118.2, 140, 244/137.1, 137.2

[56] References Cited

U.S. PATENT DOCUMENTS

| D. 145,929 | 11/1946 | Dickson et al. ................. 244/118.2 X |
| 1,713,069 | 5/1929 | Barnhart ............................ 244/118.2 X |
| 2,407,774 | 9/1946 | Fowler .................................... 244/118.2 |
| 2,480,279 | 8/1949 | Belanger et al. ..................... 244/118.2 |
| 2,697,569 | 12/1954 | Westcott, Jr. . |
| 3,361,396 | 1/1968 | Reno ..................................... 244/118.2 |
| 4,000,870 | 1/1977 | Davies . |
| 4,447,025 | 5/1984 | Bock et al. ........................... 244/118.2 |
| 5,356,097 | 10/1994 | Chalupa .................................. 244/139 |
| 5,372,332 | 12/1994 | Spacht et al. ............................. 244/2 |
| 5,540,402 | 7/1996 | Carducci ............................... 244/118.1 |

*Primary Examiner*—Robert P. Swiatek
*Attorney, Agent, or Firm*—Womble Carlyle Sandridge & Rice, P.L.L.C.

[57] ABSTRACT

A method of transporting large numbers of passengers by air from a departure airfield to a destination airfield. The method comprises providing a large flying wing airframe, providing a plurality of passenger pods adapted to be loaded with passengers at a traditional airport gate facility, loading the pods with passengers, transporting the loaded pods to the airframe parked on the tarmac, attaching the loaded pods to the underside of the airframe, and flying the airframe to the destination airfield. The method further comprises detaching the pods from the airframe in the event of an in-flight emergency and deploying parachutes from the detached pods to lower them safely to the ground. A high density air transport system that embodies the method of the invention is also provided.

14 Claims, 3 Drawing Sheets

HIGH CAPACITY AIR TRANSPORT SYSTEM AND METHOD

REFERENCE TO RELATED APPLICATION

This application claims the benefit of the filing date of U.S. provisional patent application Ser. No. 60/073,969 filed Feb. 6, 1998.

TECHNICAL FIELD

This invention relates generally to air transportation and more particularly to a high capacity air transport system and a novel method of transporting large numbers of passengers by air.

BACKGROUND OF THE INVENTION

Air travel has become a common mode of transportation throughout the world in the last half-century. As air travel has increased, there has been a need for airliners capable of transporting larger and larger numbers of passengers and more and more cargo. In response to this need, aircraft manufacturers have produced larger aircraft including, for example, the Boeing 747 and the Douglas DC-10, each of which is capable of carrying more than 300 passengers. Currently, these jumbo jets are some of the largest capacity aircraft available.

There has been a need for some time for an airliner capable of carrying many more passengers than today's jumbo jets. For particular routes such as, for example, certain Pacific rim routes, the transportation by air of up to 1,000 passengers on a single flight would be highly efficient and would reduce operating costs for the airlines. There have been some attempts to develop a "1,000 passenger" airline. For example, Airbus Industries has proposed a double-decker airliner designated as the "A3XX", which, if built, would be the world's largest commercial transport. Airbus projects that this aircraft, which has two overlying passenger decks, would be capable of transporting up to 1,000 passengers to fulfill the demand for travel on crowded routes. It is reported that other aircraft manufacturers have also been developing super jumbo jets that would be similar to the A3XX.

While the Airbus A3XX and similar super jumbo jet designs have been proposed and perhaps even built, and while they may at least partially address the need for high capacity airliners, they nevertheless are plagued by various problems and shortcomings inherent in their respective designs. For example, all of these aircraft are simply enlarged versions of traditional jet aircraft designs having a generally cylindrical central fuselage with wings and a tail section and all of the passengers are accommodated in the central fuselage. A super jumbo jet of such design creates a number of inescapable problems. For example, the aircraft itself is so large that it cannot be parked and accommodated at many existing airport gate facilities. Many gates would have to be enlarged at substantial expense or some means for shuttling passengers to the aircraft and loading them would have to be devised. Further, even if the aircraft could be parked at a gate, the check-in and management of up to 1,000 passengers and their luggage through one gate would require extensive re-design and configuration of existing airport gates. The boarding process itself would take an unacceptably long period of time and ticket agents would have to man the gates much earlier in order to handle all of the ticketing procedures that are necessary for check-in. Similar problems would exist at gates of destination airports, where up to 1,000 passengers disembarking the aircraft would have to be handled at a single gate facility.

Another problem with proposed super jumbo jet designs is related to emergency evacuation of the aircraft itself. In order to meet FAA standards, super jumbo jets must be provided with a large number of exit doors or hatches, and each of the hatches must be provided with inflatable slides, rafts, and other required safety equipment. The proposed Airbus A3XX, for example, would be provided with a total of 16 exit doors. All of these exit doors add to the weight and complexity of the airframe itself and managing the emergency egress of up to 1,000 passengers through 16 exits could be extremely difficult.

An additional problem with proposed super jumbo jets relates to their size and specifically to the long throw landing gear required to support the aircraft on the runway. Many existing airport runways simply could not accommodate such an aircraft and vast upgrades in airport and runway facilities would be required at many of the world's airports.

Other problems with a super jumbo jet design include the massive loss of life that would occur in a single fatal crash of such an aircraft, the inability to transport large numbers of passengers and also large amounts of cargo at the same time, and the sheer operating expense in fuel and maintenance required for such a large and complex structure.

Accordingly, a need exists for an improved high density, high capacity air transport system capable of transporting up to 1,000 passengers by air without requiring any modification of currently existing airport gate facilities and without congesting such gate facilities during boarding and unboarding of the aircraft. Such an aircraft should be sufficiently flexible to carry both passengers and cargo simultaneously, should incorporate emergency safety measures and devices that virtually assure survival of the passengers in the event of an in-flight emergency or aircraft failure, and should be highly efficient in operation and maintenance. It is to the provision of such a transport system and to a related method of transporting large numbers of passengers and large cargo loads by air that the present invention is primarily directed.

SUMMARY OF THE INVENTION

Briefly described, the present invention, in one preferred embodiment thereof, comprises a high capacity air transport system for transporting passengers from a departure airfield to a destination airfield. The transport system comprises a large flying wing airframe and a plurality of passenger pods adapted to be releasably attached to pylons on the bottom of the flying wing airframe. Each of the passenger pods is provided with seating and accommodations for approximately 250 passengers. Each pod is transported across the ground on wheeled transport vehicles capable of parking the pod at a traditional gate facility of an airport and transporting the pod between the gate facility and the flying wing airframe, located on a designated staging area of the tarmac. In use, each passenger pod is parked by its pod transport at an airport gate of the airport where the pod can be boarded by passengers in the traditional familiar way. Once a pod has been fully boarded, it is transported on its transport from the gate area to the staging area. The transport includes a hydraulically operated lift system such that, when positioned beneath the flying wing airframe, the loaded pod is raised by the lift system and attached to a designated pylon on the bottom of the flying wing. In a preferred embodiment, a total of four passenger pods are attached to the wing in this manner such that up to 1,000 passengers, 250 per pod, are accommodated.

With the pods attached to the flying wing airframe, the airframe taxis to a runway and takes off in the usual way. With the flying wing design of the airframe, the entire structure can be supported on the runway by short throw landing gear located along the center of the aircraft. Such landing gear defines a relatively narrow footprint compared to the wingspan of the aircraft so that the aircraft is easily accommodated by virtually all existing runways without modification to such runways.

Once airborne, the aircraft of the present invention flies at a cruising altitude to its destination airport. In the event of an in-flight emergency or catastrophic failure of the airframe, the pods can be detached and jettisoned from the airframe and arrays of parachutes that are stowed in the pods are deployed to lower the pods safely to the ground or into the water. In the event of such an event over water, an array of inflatable rafts or floats are deployed to float the pod until rescue teams can arrive. In this way, the survivability of passengers in the event of a catastrophic failure of the aircraft itself is enhanced manyfold.

The invention also comprises a novel method of transporting large numbers of passengers by air from a departure airfield to a destination airfield. The method comprises the steps of providing an airframe located at the departure airfield, providing a plurality of passenger pods at the departure airfield, each pod containing seats and accommodations for a predetermined number of passengers, and loading each of the plurality of pods with passengers at a traditional airport gate facility located at the departure airfield. The method further comprises transporting the loaded pods across a tarmac to the airframe, attaching each of the loaded pods to the wings of the airframe, and flying the airframe with pods attached thereto to the destination airfield. The pods are detached at the destination airfield and each pod is transported across the tarmac to a designated gate facility at the destination airfield where it is unloaded in the usual way.

Accordingly, a unique and truly revolutionary new method and transport system is now provided for transporting large numbers of passengers or large cargo loads by air. The many advantages of the system include the capacity to carry up to 1,000 passengers at a time without any modifications or congestion of existing airport runways or gate facilities. The system is much more efficient than traditional aircraft designs for a number of reasons, including the ability to load pods owned by various airlines on the same wing for transportation to a common destination, the ability to mix cargo pods with passengers pods on the same flight, and the general overall efficiency and ease of maintenance of a flying wing airframe design compared to that of a traditional airframe. In addition, the short throw landing gear of the airframe permits takeoffs and landings on virtually all existing modern runways without any improvements or modifications required to the runways.

A particularly poignant and important advantage of the system and method of the present invention is that it is inherently many times safer than a traditional jet aircraft. This is because each of the pods of the system can be detached and lowered to earth on parachutes in the event of an in-flight catastrophic failure or emergency. There is currently no passenger airliner that provides such a life saving feature. In addition, since the crew quarters are located in the flying wing airframe itself, the passengers in the passenger pods are isolated from the crew compartment. Accordingly, a hijacking is much less likely with the present invention than with traditional aircraft. In the event of an attempted hijacking, the pods can simply be detached and lowered to earth on their parachutes, foiling the attempts of the hijacker or at least preventing him from endangering the passengers.

Thus, it is an object of the present invention to provide a high capacity air transport system that is capable of transporting large numbers of passengers or large cargo loads without requiring modifications to existing airport facilities.

Another object of the invention is to provide a high capacity air transport system that saves the passengers in the event of a catastrophic and otherwise fatal in-flight failure of the airframe.

A further object of the invention is to provide an air transport system capable of transporting 1,000 or more passengers safely on long overseas flights.

Another object of the invention is to provide a high capacity air transport system that is versatile in that passengers of more than one airline company can be transported simultaneously to a common destination.

These and many other objects, features, and advantages of the present invention will become more apparent upon review of the detailed description set forth below taken in conjunction with the accompanying drawings, which are briefly described as follows.

DETAILED DESCRIPTION OF THE PREFERRED EMBODIMENT

Figure 1:
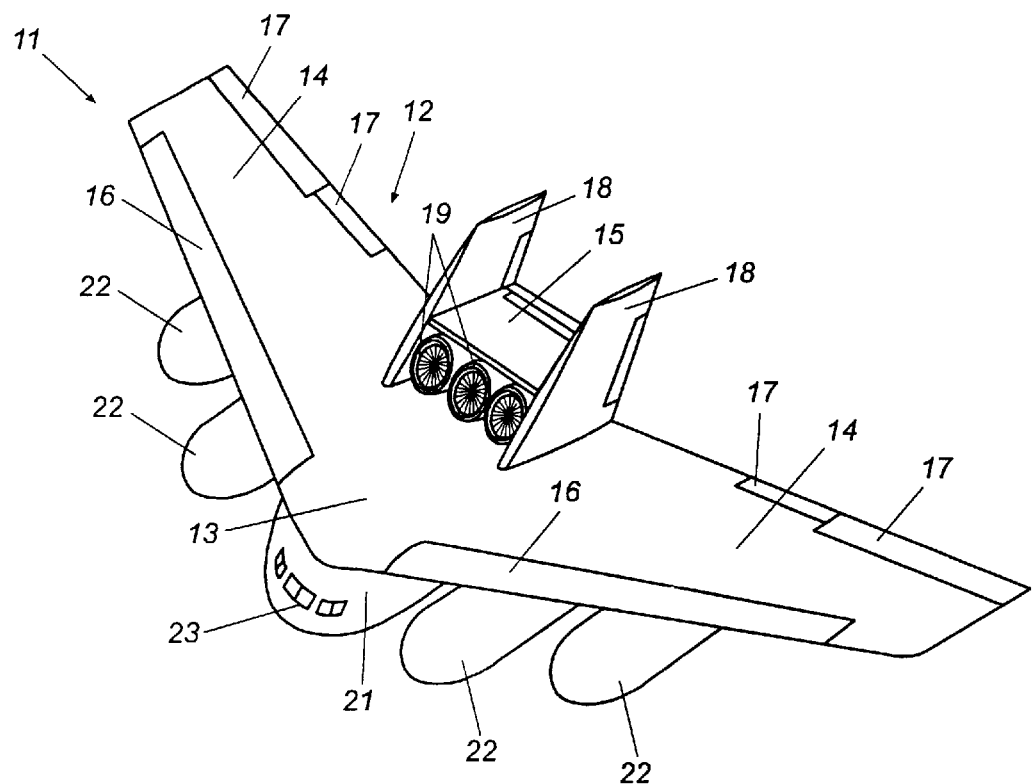
FIG. 1 is a perspective view of a high capacity air transport vehicle that embodies principles of the present invention in a preferred form.
Figure 2:
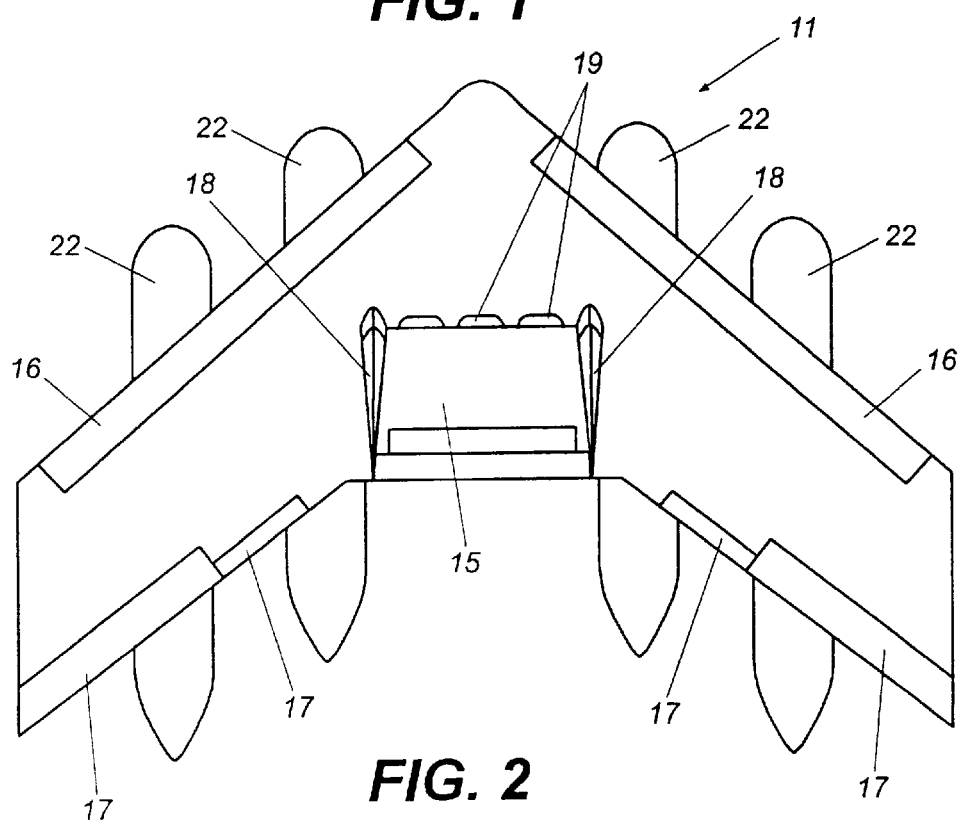
FIG. 2 is a top plan view of a high capacity air transport vehicle of FIG. 1.

Referring now in more detail to the drawings, in which like numerals refer to like parts throughout the several views, FIGS. 1–4 illustrate an air transport aircraft and system that embodies principles of the invention in a preferred form. The aircraft and transport system 11 comprises a flying wing style airframe 12 having a mid-section or central portion 13 and wing sections 14. A central fuselage 21 depends from the underside of the midsection 13 and is formed integrally with the flying wing airframe. Flight deck and crew compartment 23 is housed in the fuselage 21 as well as flight controls, navigation, avionics, and other equipment necessary for flying the airframe.

Figure 4:
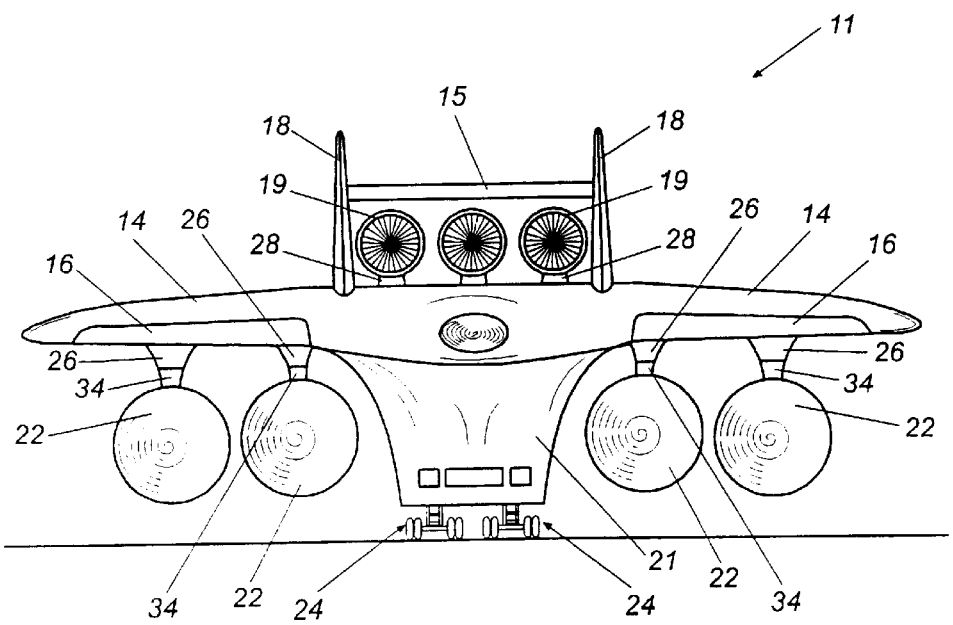
FIG. 4 is a front elevational view of an aircraft of this invention showing the short throw landing gear and a preferred positioning of the crew compartment and engines.

The airframe 12 is provided with traditional control surfaces commonly found on such aircraft including slats 16 and flaps 17. Vertical stabilizers 18 can be provided if required for additional stability and an ancillary horizontal stabilizer 15 can also be provided. However, the vertical and horizontal stabilizers 18 and 15 are not a requirement since many flying wing aircraft operate without these structures. Thus, they should not be considered a limitation of the invention. A set of three turbojet engines 19 are mounted to the top of the airframe 12 on respective pylons 28 (FIG. 4). Preferably, the pylons 28 can be vectored to turn the engines 19 slightly from side-to-side to provide added steering control for the aircraft. In this way, turns can be initiated and completed without banking the aircraft to large banking angles, which could be uncomfortable for passengers.

Figure 3:
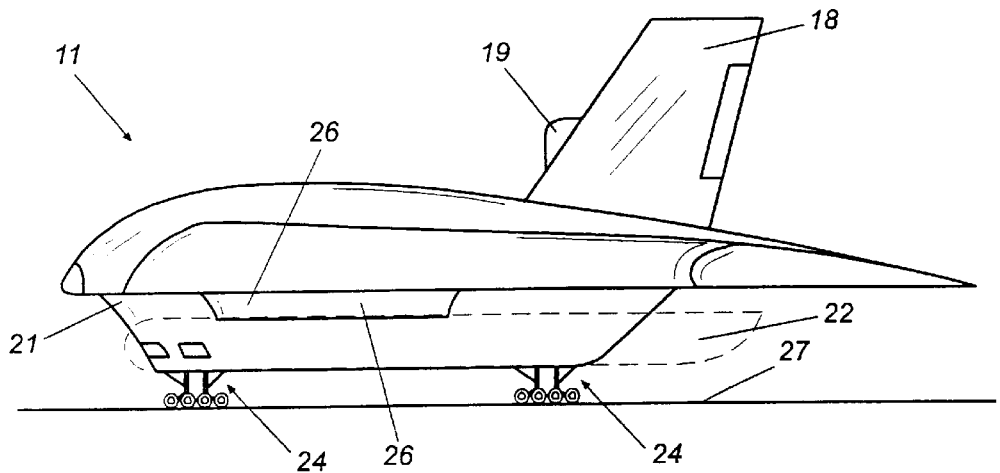
FIG. 3 is a side elevational view of an aircraft that embodies principles of the invention illustrating attachment of the passenger pods to pylons beneath the wings of the airframe.

As best illustrated in FIGS. 3 and 4, sets of short throw landing gear 24, similar to the landing gear previously used on military bombers, depend from the underside of the fuselage 21 and support the airframe on a tarmac. The landing gear could, for example, comprise four sixteen-wheel bogeys that are retracted into the fuselage of the airframe once the aircraft is in flight. The use of short throw landing gear as illustrated in FIGS. 3 and 4 provides a relatively small footprint that allows the airframe of the present invention to take off and land from virtually any modern commercial airport without any modifications to the runway to accommodate the large size of the aircraft.

A set of four pods 22 are mounted to the undersides of the wing sections 14 of the airframe and are suspended from pylons 26 that project downwardly from the wing. As described in more detail below, each of the pods 22, in a passenger configuration of the present invention, is configured to accommodate approximately 250 passengers. Alternatively, cargo pods can be configured to accommodate a predetermined amount of cargo to be transported. The pods 22 are releasably attached to the depending pylons 26 on the wings by upstanding attachment pylons 34 that form a part of the pods.

Figure 5:
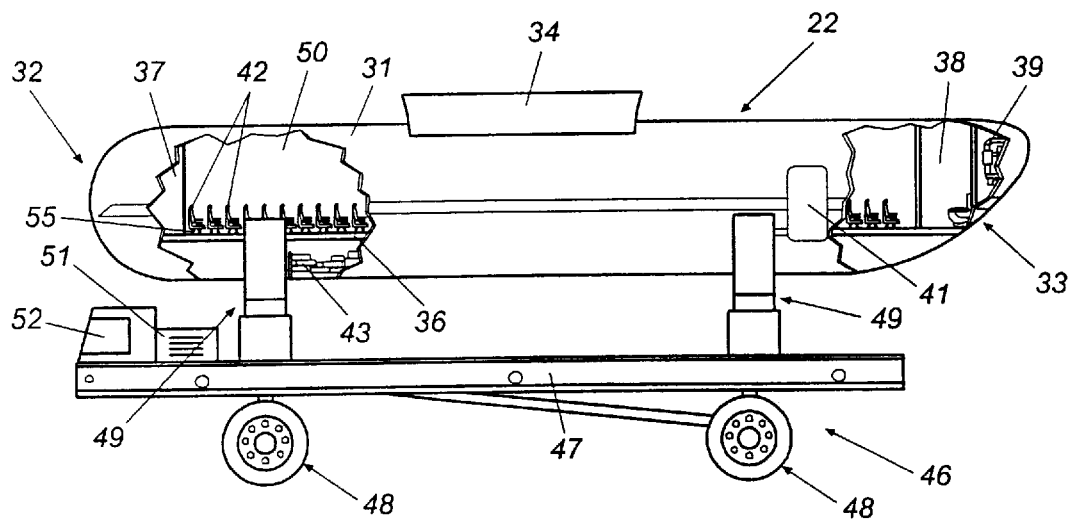
FIG. 5 is a side elevational partially cut-away view of a passenger pod and its passenger transport, each of which embodies principles of the present invention in a preferred form.

As best illustrated in FIG. 5, each of the pods 22 comprises a generally cylindrical body 31 having a closed rounded forward section 32 and an aft section 33. The attachment pylon 34 is secured to the pod and projects upwardly therefrom. The attachment pylon 34 carries mechanisms for securely attaching the pod 22 to the depending pylon of a wing. In addition, and significantly, the pylon 34 also houses an array of emergency parachutes and means for deploying the parachutes in the case of an in-flight emergency or catastrophic failure.

A floor 36 is disposed in the pod and separates the pod into an upper passenger compartment 50 and a lower baggage compartment 43. In the preferred embodiment, the forward section 32 of the pod is provided with a galley 37 for preparing meals for passengers and the aft section 33 is provided with a lavatory 38 and a location for electrical equipment, APU, and cabin environmental controls. Passenger seats 42 are mounted to the floor 36 and, preferably, face rearwardly with respect to the direction of flight of the aircraft. Further, each of the seats is mounted on a shock mount 55. With this configuration, in the event of an emergency drop of the pod as detailed below, at least some of the force of impact of the pod with the ground is absorbed by the seats and the shock mounts thereof. Accordingly, passengers are protected better and survivability is enhanced. A traditional aircraft exit hatch 41 is provided for loading and unloading the pod and for emergency egress.

In the preferred embodiment, the pod is fabricated as an oven-cured filament wound structure and has no windows. This decreases the weight of the structure, increases its strength, reduces wind noise, and reduces the cost of pod manufacture. Preferably, outside views could be projected on TV screens within the pods to provide passengers with a view of the landscape. Alternatively the pods could be formed with traditional aircraft windows if desired, but these windows likely would increase the weight of the pods.

A pod transport 46 (FIG. 5) is provided for moving the pod 22 on the ground between the gate and the airframe. The transport 46 in the preferred embodiment has a bed 47 that is supported on a set of wheels 48. An engine and hydraulic compartment 51 is provided on the front of the bed as is a cab 52 from which the transport is driven.

A pair of hydraulically actuated cradles 49 are mounted to the bed 47 of the transport 46. These cradles can be raised and lowered hydraulically as needed to position the pod 22 at an appropriate height for loading at a terminal gate and can also raise the pod beneath the wing of the airframe for attaching the pod to the airframe prior to flight. Alternatively, the cradles 49 could be static and a separate specialized loading lift could be provided for removing the pod from its transport 46 and raising it for attachment to the flying wing airframe of the system.

OPERATION

The system of the present invention is operated as follows to transport large numbers of people between destinations. Passenger pods located at a departure airport are transported on their transports to respective airport gate facilities for loading. At the gate facilities, the pods are loaded in the usual way and up to 250 passengers board each pod and take their seats. When each of the pods is loaded, it is transported on its transport from the gate area to a designated staging area on the tarmac where the flying wing airframe is parked. At the staging area, each of the pods is lifted, either by its transport 46 or by a specialized lift, to the bottom of the flying wing airframe where it is attached to the pylons depending from the wing. When four loaded pods have been attached to the airframe, the aircraft taxis to the runway and takes off in the usual way to travel to its destination.

Figure 6:
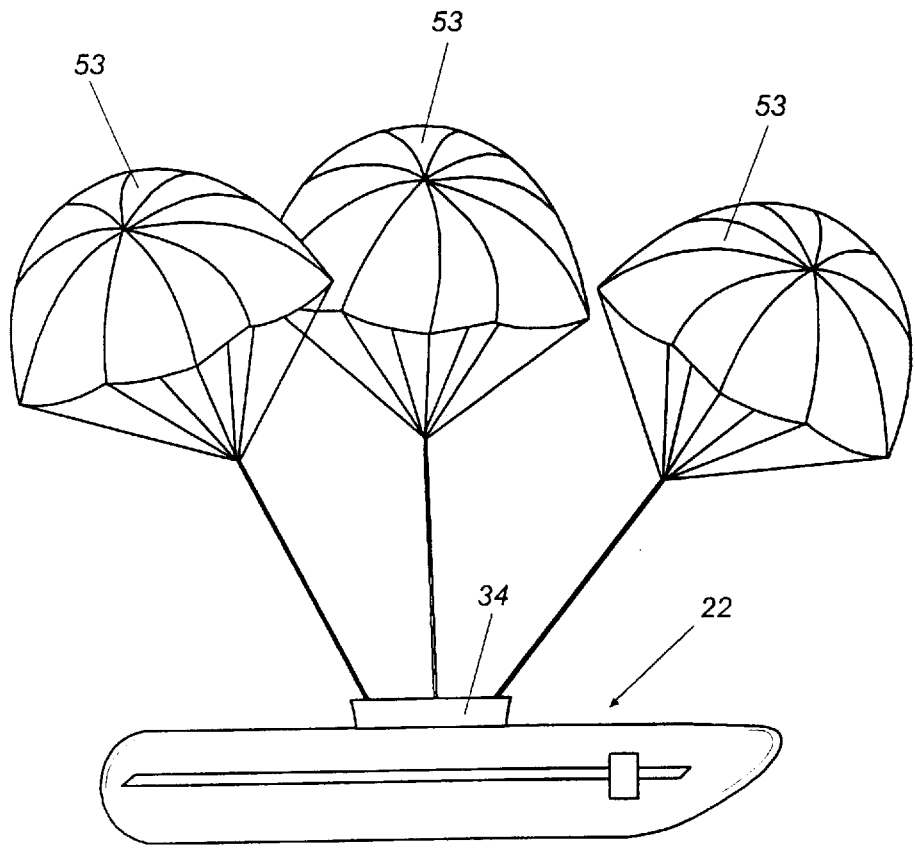
FIG. 6 illustrates the deployment of an array of parachutes from one of the pods of the present invention to lower the pod safely to the ground in the event of an in-flight emergency.

In the event of an in-flight emergency or catastrophic failure of the airframe or its engines, the pods 22 can be detached from the airframe. This could be done by the pilot or, alternatively, could be automatic under certain circumstances. Once detached, each of the pods deploys an array of parachutes 53 (FIG. 6) from its upper pylon 34. The parachutes lower the pod 22 to the ground. When the pod impacts the ground, the rear facing shock mounted seats help to absorb the force of the impact in order to insure that the passengers survive the incident. To protect the crew stationed in the flying wing airframe, traditional ejection mechanisms are provided. Thus, in the event of a catastrophic mechanical failure, both the passengers and crew have a very high probability of survival, even though the airframe itself is destroyed in a crash.

If the flight continues without incident, the aircraft of the present invention lands at its destination airport and taxis to a staging area on the tarmac. Here, lifts or transports as described above move to the staging area for picking up the pods and transporting them to gate facilities at the airport. Each pod is then unloaded at its respective gate facility in the usual way.

The present invention offers a number of advantages over other proposed super jumbo jet high capacity aircraft designs. Among the advantages are that pods from different airlines can be mixed and matched on single flight to a common destination. Empty and unsold seats are thereby reduced. Safety is greatly enhanced since the pods can be jettisoned in the event of an emergency and are lowered to the ground on parachutes. The aircraft of the present invention can accommodate up to 1,000 passengers on a single flight without any modification to or stress on existing airport gate facilities and without any modification to airport runways. The flying wing airframe design of the present invention, which has been employed successfully in large military bombers for several years, has proven itself to be efficient in operation and is fully capable of carrying the weight of 1,000 passengers loaded in the depending pods.

The invention has been described herein in terms of preferred embodiments and methodologies. It will be obvious to those of skill in the art, however, that various modifications, additions, and deletions might be made to the illustrated embodiments within the scope of the invention. For example, the placement of the vertical and horizontal stabilizers and engines illustrated in the preferred embodiment could be vastly different from that shown or might be eliminated altogether. The pods themselves could be designed with a different appearance as could the fuselage of the airframe and the shape of the wing itself. Traditional airport tugs and cradle trailers could be used to transport the pods rather than the motorized transport shown in the preferred embodiment, although a special function transport is preferred for its many advantages. Finally, the invention has been described primarily in terms of transporting passengers. It will be understood by those of skill in the art, however, that the invention is equally applicable to the transport of cargo contained in cargo pods. In fact, one of the advantages of the present invention is that passenger pods and cargo pods can be mixed on the same flight without interfering with the comfort of the passengers on the flight. These and other additions, deletions, and modifications might be made by those of skill in the art without departing from the spirit and scope of the invention as set forth in the claims.

I claim:

1. A method of transporting large numbers of passengers by air from a departure airfield to a destination airfield, said method comprising the steps of:

(a) providing an airframe located at the departure airfield;

(b) providing a plurality of passenger pods at the departure airfield, each pod containing seats and accommodations for a predetermined number of passengers;

(c) loading each of the plurality of passenger pods with passengers at a traditional airport gate facility located at the departure airfield;

(d) transporting the loaded pods across a tarmac to the airframe;

(e) attaching each of the loaded pods to the wings of the airframe;

(f) flying the airframe with pods attached to the destination airfield;

(g) detaching the pods from the airframe at the destination airfield;

(h) transporting the detached pods on the tarmac to gate facilities at the destination airfield; and (i) unloading passengers from the pods at the gate facilities.

2. A method of unloading large numbers of passengers by air as claimed in claim 1 and wherein the airframe is a flying wing.

3. A method of transporting large numbers of passengers by air as claimed in claim 2 and wherein step (e) comprises attaching the loaded pods to respective pylons located on the underside of the flying wing.

4. A method of transporting large numbers of passengers by air as claimed in claim 3 and wherein the flying wing includes flight controls and a crew compartment integrally formed with the flying wing and isolated from the pods.

5. A method of transporting large numbers of passengers by air as claimed in claim 1 and further comprising the step of detaching the pods from the airframe in the event of an in-flight emergency and deploying parachutes from the detached pods to lower the pods and their passengers safely to the ground.

6. A method of transporting cargo by air to a destination, said method comprising the steps of:

(a) providing a flying wing airframe;

(b) providing a plurality of cargo pods;

(c) loading the cargo pods with cargo at loading facilities and transporting the loaded pods by ground to the flying wing airframe;

(d) attaching the loaded cargo pods to the flying wing airframe;

(e) flying the flying wing airframe and attached pods to the destination;

(f) detaching the pods from the flying wing airframe and transporting the detached pods by ground to unloading facilities; and (g) unloading the cargo from the pods.

7. The method of claim 6 and wherein the cargo is passengers.

8. The method of claim 6 and wherein the step of transporting the loaded pods comprises loading the pods onto a ground transport vehicle and moving the pods on their ground transport vehicles to the flying wing airframe.

9. The method of claim 6 and further comprising the step of detaching the pods from the flying wing airframe in the event of an in-flight emergency and deploying parachutes from the pods to lower the pods safely to the ground.

10. A high density air transport system for transporting cargo from a departure airfield to a destination airfield, said transport system comprising a flying wing airframe, a plurality of pods adapted to be loaded with cargo to be transported, loading facilities at the departure airfield for loading said pods with cargo, means for moving said pods from said loading facilities to said flying wing airframe, means for releasably attaching said pods to the underside of said flying wing airframe, engines on said flying wing airframe for flying said flying wing airframe with attached pods to the destination airfield, unloading facilities at the destination airfield, and means at said destination airfield for moving said pods from said flying wing airframe to said unloading facilities for unloading cargo from said pods.

11. A high density air transport system for transporting cargo from a departure airfield to a destination airfield as claimed in claim 10 and further comprising means for detaching said pods from said flying wing airframe in the event of an in-flight emergency and a parachute deployment system in each of said pods for lowering the detached pods safely to the ground.

12. A high density air transport system for transporting cargo from a departure airfield to a destination airfield as claimed in claim 11 and wherein said cargo is passengers and wherein said facilities at the departure and destination airfields for loading and unloading said pods comprises airport gate facilities.

13. A high density air transport system for transporting cargo from a departure airfield to a destination airfield as claimed in claim 12 and wherein said means for moving said pods to and from said flying wing airframe comprises a hydraulically actuated wheeled cradle for receiving and supporting at least one of said pods and motive means for moving said cradle and its pod across the ground between said loading and unloading facilities and said flying wing airframe.

14. A high density air transport system for transporting cargo from a departure airfield to a destination airfield as claimed in claim 13 and wherein said motive means comprises a tug.

* * * * *